UNITED STATES PATENT OFFICE 2,686,781

PYRIDO(3,2-d)PYRIMIDINES AND PROCESS OF PREPARING SAME

George H. Hitchings, Tuckahoe, and Roland K. Robins, Yonkers, N. Y., assignors to Burroughs Wellcome & Co. (U. S. A.) Inc., Tuckahoe, N. Y., a corporation of New York No Drawing. Application January 14, 1953, Serial No. 331,316

6 Claims. (Cl. 260—256.4)

This invention relates to a new series of pyrido (3,2-d) pyrimidines which are of value as pharmaceutical intermediates and as inhibitors of growth of microorganisms.

The synthesis of these compounds involves the initial preparation of a 2,4-dihydroxypyrido (3,2-d) pyrimidine by reacting a 3-aminopicolinic acid with urea

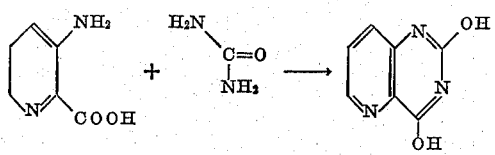

and the resultant converted to the corresponding 2,4-dichloropyrido (3,2-d) pyrimidine. The desired substances are formed from 2,4-dichloropyrido (3,2-d) pyrimidines by reaction with reagents of the amine class. By treatment with thiourea, the 2,4-dimercaptopyrido (3,2-d) pyrimidine is obtained. The latter is a suitable intermediate for the preparation of derivatives bearing different functional substituents in the 2 and 4-positions in a manner similar to that disclosed in applications of Hitchings and Russell, Serial Nos. 261,393, 261,394 and 261,395.

The following examples are illustrative of the teachings of this invention.

EXAMPLE 1

*Preparation of 2,4-dihydroxypyrido (3,2-d) pyrimidine*

Forty grams of 3-aminopicolinic acid was heated in a casserole with 80 g. of urea. The mixture which melted at 110° was kept at 160° until the clear melt became mushy. The temperature was then gradually raised to 180° and heating discontinued after 5 minutes.

The cooled solid was dissolved in 400 ml. of hot 2 N sodium hydroxide and the solution allowed to stand at room temperature for 1 hour and was then filtered.

The filtrate was warmed on the steam bath while being saturated with a stream of carbon dioxide. The cooled solution yielded 21 g., M. P. >360°. A small amount was recrystallized from glacial acetic acid for analysis.

EXAMPLE 2

*2,4-dichloropyrido (3,2-d) pyrimidine*

Ten grams of 2,4-dihydroxypyrido (3,2-d) pyrimidine was added to 150 ml. of phosphorus oxychloride and 50 g. phosphorus pentachloride. The solution was refluxed for 2 hours and the excess phosphorus oxychloride distilled off under vacuum and the residue added to 200 g. of crushed ice. The cold aqueous solution was extracted with chloroform and the chloroform extract washed with water and dried over magnesium sulfate. Evaporation of the chloroform left 5.1 g. of slightly yellow product, M. P. 170–175°. A small amount of product, was recrystallized from "skellysolve C" to yield white plates, M. P. 177°.

EXAMPLE 3

*2,4-diaminopyrido (3,2-d) pyrimidine*

Two and five tenths grams of crude 2,4-dichloropyrido (3,2-d) pyrimidine was added to 20 ml. of alcoholic ammonia, (alcohol saturated with dry ammonia at 0° C.) and the solution placed in a bomb and heated at 155°–160° for 18 hours. The cooled solution was added to an equal volume of water and the solution made strongly basic with sodium hydroxide. The filtered product was recrystallized from 250 ml. of 50% ethanol to yield fine white needles, M. P. 317–319°.

EXAMPLE 4

*2,4-dianilinopyrido (3,2-d) pyrimidine*

One gram of 2,4-dichloropyrido (3,2-d) pyrimidines and 2 g. of anilino were heated together overnight on the steam bath. The solid residue was dissolved in an ethanol water mixture and the solution made basic with sodium hydroxide. The cooled solution yielded 1.3 g. of tan needles, M. P. 168–170°. A second recrystallization from ethanol did not raise the melting point.

EXAMPLE 5

*2,4-dimercaptopyrido (3,2-d) pyrimidine*

Six grams of thiourea was dissolved in 200 ml. of absolute alcohol and the solution cooled to room temperature and 6.0 g. of crude 2,4-dichloropyrido (3,2-d) pyrimidine added and the solution refluxed on the steam bath for five hours. The reaction mixture was then cooled and filtered and the precipitate dissolved in cold 2 N sodium hydroxide and precipitated with dilute acetic acid. The filtered precipitate was washed and dried to yield 4.3 g. of yellow green amorphous powder. Two grams of this product was purified by Soxhlet extraction using absolute alcohol to give 1.6 g. of yellow-orange crystals, dec. 335–340°.

EXAMPLE 6

*2-mercapto-4-aminopyrido (3,2-d) pyrimidine*

Two and three tenths grams of crude 2,4-dimercaptopyrido (3,2-d) pyrimidine were dissolved in 100-ml. of concentrated ammonium hydroxide and the solution gently warmed on the steam bath. After about one-half hour a light green precipitate appeared. The solution was allowed to evaporate to 25 ml. and then 100 ml. of concentrated ammonium hydroxide was again added and the solution heated on the steam bath. This procedure was repeated three times then the solution was filtered hot and the precipitate washed with cold concentrated ammonium hydroxide and dried. Yield was 1.8 g. of small yellow-orange needles, dec. 345°.

We claim:

1. The method of preparing 2,4-diaminopyrido (3,2-d) pyrimidines wherein 2,4-dichloropyrido (3,2-d) pyrimidine is reacted with a reagent selected from the class consisting of ammonia and amines.

2. The method of preparing 2-mercapto-4-aminopyrido (3,2-d) pyrimidines wherein 2,4-dimercaptopyrido (3,2-d) pyrimidine is reacted with a reagent selected from the class consisting of ammonia and amines.

3. The method of preparing 2,4-dihydroxy pyrido (3,2-d) pyrimidines wherein 3-aminopicolinic acid is reacted with urea.

4. The method of preparing 2,4-dichloropyrido (3,2-d) pyrimidines wherein 3-aminopicolinic acid is reacted with urea and the resulting compounds converted to the 2,4-dichloropyrido (3,2-d) pyrimidine.

5. The method of preparing 2,4-diaminopyrido (3,2-d) pyrimidines wherein 3-aminopicolinic acid is reacted with urea, the resultant compound converted to the 2,4-dichloropyrido (3,2-d) pyrimidine and this compound reacted with a reagent selected from the class consisting of ammonia and amines to form the 2,4-diaminopyrido (3,2-d) pyrimidine.

6. The method of preparing 2,4-dimercaptopyrido (3,2-d) pyrimidines wherein 3-aminopicolinic acid is reacted with urea, the resultant compound converted to the corresponding 2,4-dichloropyrido (3,2-d) pyrimidine and this compound reacted with thiourea to form the 2,4-dimercaptopyrido (3,2-d) pyrimidine.

No references cited.